Patented Nov. 25, 1941

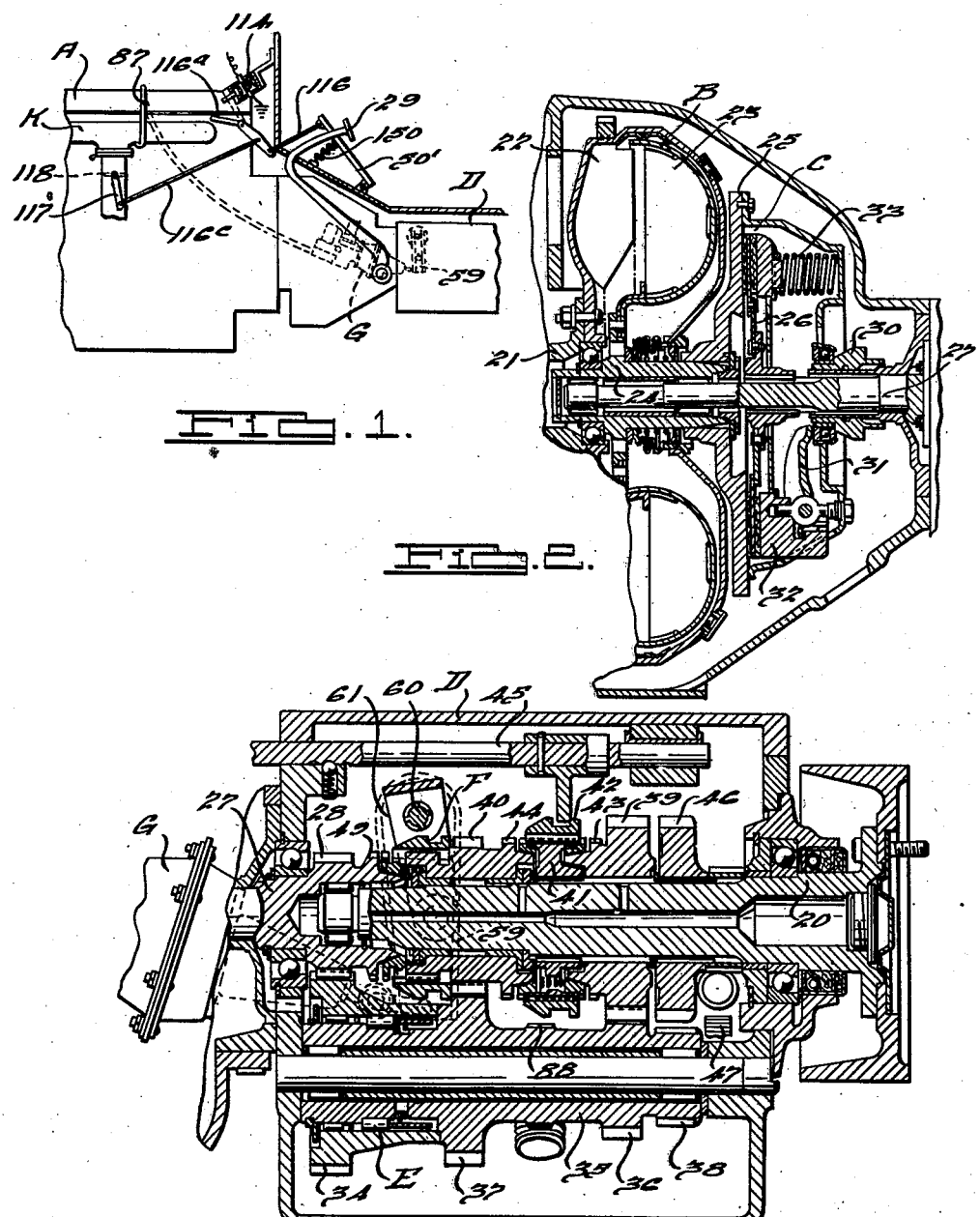

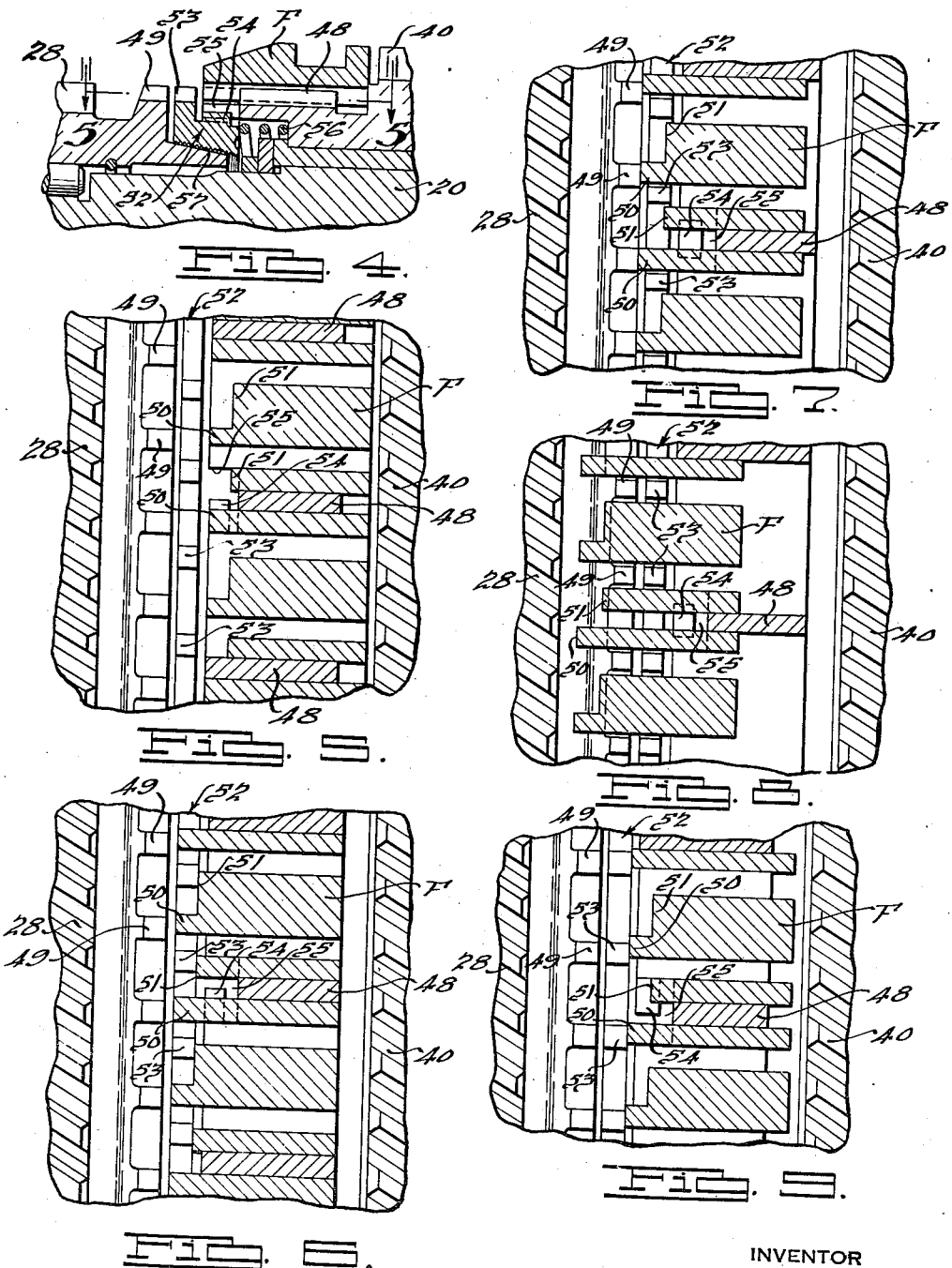

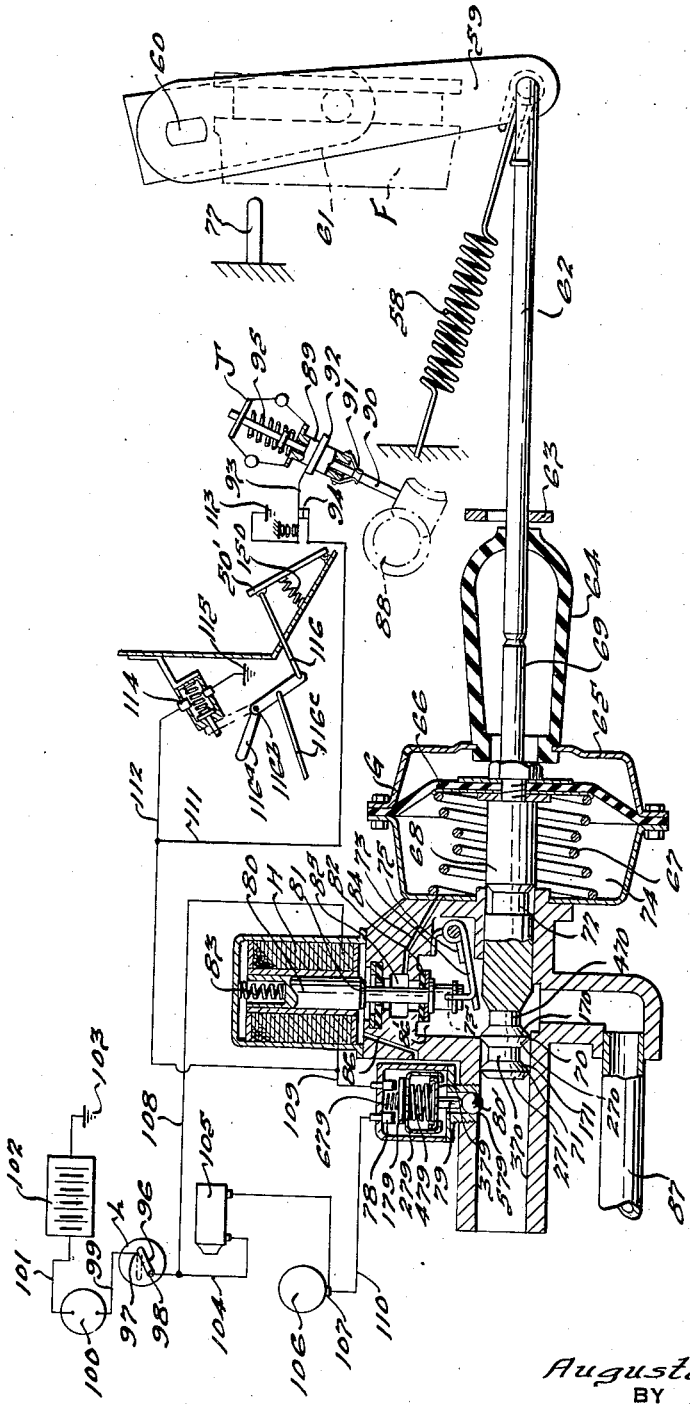

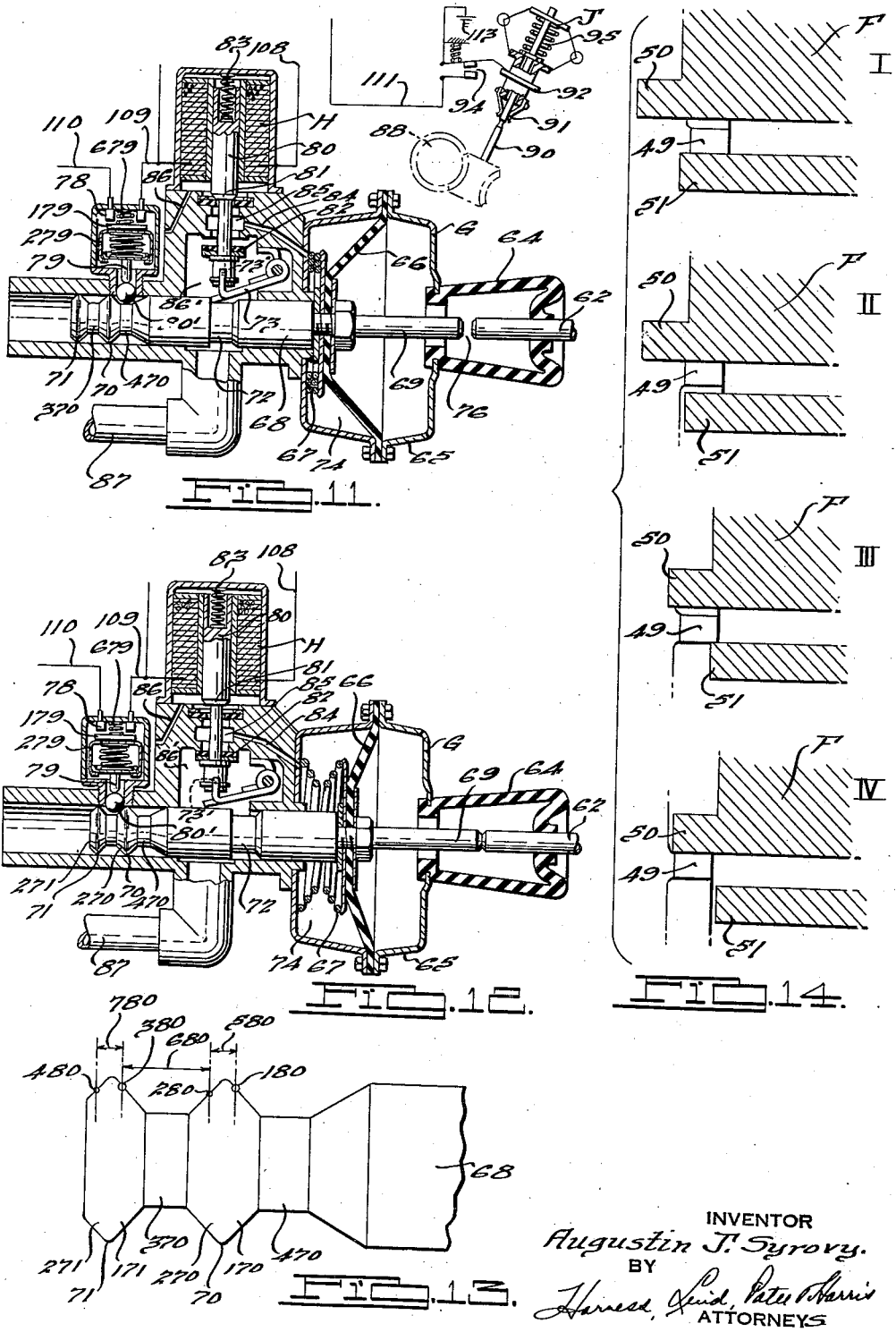

2,264,010

UNITED STATES PATENT OFFICE 2,264,010

POWER TRANSMISSION

Augustin J. Syrovy, Detroit, Mich., assignor to Chrysler Corporation, Highland Park, Mich., a corporation of Delaware Application November 1, 1940, Serial No. 363,945

12 Claims. (Cl. 74—472)

This invention relates to motor vehicles and refers more particularly to power transmission and control mechanism therefor.

My invention has particular reference to transmission systems in which the torque load is relieved as by momentary interruption of the engine ignition or by other suitable means in order to unload positively engageable drive control elements so as to facilitate disengagement of such elements. One example of such a transmission is described and claimed in the copending application of Carl A. Neracher et al., Serial No. 335,310, filed May 15, 1940.

In such transmission systems, the engine ignition when interrupted accommodates disengaging movement of the movable or shiftable drive control element but it sometimes happens that the interrupting mechanism functions to restore the ignition and hence the torque load at the drive control elements before disengagement thereof has been effected. This results in failure of the transmission to function properly. It is, of course, desirable to interrupt the ignition for as brief an interval of time as is necessary and because of many factors it is difficult to arrive at a time interval for setting the ignition interrupting mechanism so that it will function the same under all conditions. Among these factors are variation in oil viscosity, variation in clearance between the drive control elements and the fit of the parts in general, requirements for disengagement of the drive control elements incident to kick-down and bringing the car to a stop, and other factors all of which give rise to the aforesaid failure. Furthermore it is not always so much the time of torque interruption that is of greatest importance in effecting the disengagement. Of greater significance in many instances is the effect of torque interruption itself because it is during the change in the condition of torque load that it is possible to disengage the movable drive control element. Thus, if the load is a drive load then the interruption either relieves this load sufficiently to allow movement of the movable element or is of such duration as to change the drive load to a coast load thereby also accommodating the disengagement during the interval of this change. If the initial load is a coast load then the same effect is obtained by either relieving this load or reversing it to a drive load during torque interruption. If the interruption occurs for an indefinitely long period of time and the movable element fails to disengage, prolongation of the time of interruption is of no avail because the torque load quickly reverses and it is as a practical matter just as difficult to disengage the element under either drive or coast load.

It is an object of my invention to overcome the aforesaid failure by insuring disengagement of the movable drive control element under all desired conditions. This not only insures proper functioning of the transmission mechanism but also provides for wider latitude in the allowable tolerances and clearances in the manufacture of the mechanism and controls therefor, and renders the device less sensitive to changes in temperature and resulting lubricant viscosity variation.

In carrying out my invention I provide means automatically relieving the torque load or reversing the torque load for a plurality of times or cycles in response to the control mechanism which sets the interrupting means in operation. Thus, where the engine ignition is employed as the means for effecting the disengagement, I arrange the mechanism so that the ignition is momentarily interrupted a plurality of times in rapid sequence, each momentary interruption comprising a step of rendering the ignition inoperative and a step of restoring the ignition to normal operation. This arrangement provides for a number of periods of torque relief or reversal of torque depending on the length of time for each momentary interruption. Such arrangement provides for step-by-step release of the movable drive control element in response to a force continuously urging disengagement of the movable element because each time that the torque load at the element is relieved or changed as aforesaid, the disengaging force may act to impart releasing movement to the movable element until restrained by the re-occurrence of resisting torque load.

Further objects and advantages of my invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

Fig. 12 is a similar view of a portion of the Fig. 10 control mechanism in a further operating position.

Fig. 13 is an enlarged detail view of the switch operator.

Fig. 14 is a diagrammatic view illustrating the step-by-step disengagement of the movable drive control element.

While my control may be employed in conjunction with various types and arrangements of motor vehicle transmissions, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an over-running clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 150 to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A unitary blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of over-running clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 to 12, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a reciprocatory member or leader rod 68 which has a rear extension 69 aligned with rod 62

In carrying out my invention I provide means which functions to relieve the thrust-application between the teeth of sleeve F and the teeth 49 for a number of times thereby facilitating movement of the drive-control sleeve F from its engaging relationship into its disengaging relationship with respect to the teeth 49. Where the relief of the thrust-application is effected by momentary interruption of the engine ignition system, this means may be in the form of switch controlling cams or detents 70 and 71 formed on the front end of rod 68. Cams 70 and 71 have the switch-closing cam faces 170 and 171 respectively, and the switch-opening cam faces 270 and 271 respectively. Cams 70 and 71 are separated by detent 370 and rearwardly adjacent cam 70 there is another detent 470. Rod 68 also is formed with a detent 72 which cooperates with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. Latch 73 thus provides a releasable holding means for the rod 68. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the primary terminal of the usual distributer of the ignition system whereby the engine ignition may be momentarily rendered ineffective thereby unloading the torque at sleeve F for a number of successive cycles sufficient to insure its release by spring 67. This ignition interrupting system is under control of an interrupter switch 78 which is closed and opened by plunger 79 and ball 80' a plurality of times whenever rod 68 moves from its Fig. 11 position to its Fig. 10 position by reason of the switch-operating cams 70 and 71. The switch 78 comprises a conductor bridge piece 179 carried by cup 279 which retains the spring seat 379 carried at the outer end of plunger 79. A spring 479 forms a yielding connection between cup 279 and seat 379 so that when ball 80' moves upwardly, the bridge piece 179 electrically connects the terminals of the switch, the spring 479 yielding to accommodate any excess of movement of the ball beyond that required to engage the bridge piece 179 with the terminals. Ball 80' is prevented from falling inwardly beyond its position shown in Figs. 10 and 11 by reason of the in-turned seat 579 formed by peening the ball guide inwardly. A spring 679 yieldingly urges the assembly between bridge piece 179 and ball 80' inwardly to the Fig. 10 position of these parts.

When the latch 73 is released with the parts positioned as in Fig. 11, sleeve F being clutched, spring 67 operates to close the gap 76 at the lost-motion between rod portion 69 and rod 62 thereby establishing thrust-transmitting relationship between spring 67 and follower rod 62 for acting through lever 59 and yoke 61 to urge sleeve F rearwardly into its Fig. 4 position of disengagement with respect to the pinion teeth 49.

In order to illustrate the principles of my invention let it be further assumed that latch 73 is released as aforesaid during the kick-down operation as will presently be more apparent, such that the engine is operating under open throttle conditions whereby the engine torque is acting to cause pinion teeth 49 to transmit its drive at the sides of the short teeth 51 of sleeve F. This condition is illustrated at I in Fig. 14, it being understood that the clearances between the teeth 49 and sleeve F are exaggerated in order to illustrate the action.

Under the foregoing circumstances rod 68 moves forwardly in taking up gap 76, cam face 170 moving ball 80' outwardly so that when the ball and cam contact is approximately at the point 180 in Fig. 13, the switch 78 is closed by engagement of bridge piece 179 with the switch terminals. This grounds the ignition and, although the engine throttle remains open, the engine rapidly slows down causing relief in the torque load at teeth 49. In Fig. 14 it is assumed that the duration of interruptions is sufficiently long to cause a reversal in the direction of torque between teeth 49 and sleeve F. Therefore, as gap 76 is taken up, the ignition is interrupted at point 180 and sleeve F starts its releasing movement under the thrust of spring 67 acting through rod 69 on rod 62 until it reaches some position II at which further sleeve movement is prevented because of the coast load between teeth 49 and the sides of the long teeth 50. However, during the sleeve movement from I to II, the rod 68 has moved at least sufficiently so that the ball 80' has moved inwardly on cam face 270 to the point 280 at which point the switch 78 opens to restore the ignition to normal operation. This causes the engine to again impose a drive load at teeth 49 causing another reversal of torque and during this reversal the sleeve further releases from II to III. During this sleeve movement the rod 68 has moved at least sufficiently to cause cam face 171 to lift ball 80' to the point 380 whereupon switch 78 again closes to bring about another torque reversal accompanied by further releasing movement of sleeve F from III to IV by which time rod 68 has correspondingly moved to allow cam face 271 to lower ball 80' at least to the point 480 for closing switch 78 to again restore the ignition. This causes another reversal of torque and by this time the teeth 49 will clear teeth 51 and sleeve F moves into its fully released position as the engine speeds up to engage the overrunning clutch E.

In approximately the foregoing manner it will be appreciated that the sleeve F is subjected, in the case of two cams 70, 71, to four changes of torque conditions at teeth 49. I have shown actual torque reversals in Fig. 14 sufficient to shuttle teeth 49 between the sides of teeth 50 and 51 as my invention can best be illustrated in this manner. However, with my rapid sequence of torque interruptions there would not ordinarily be sufficient time for the shuttling condition to actually take place but there is the tendency for such shuttling to take place and the parts may, of course, be designed in relationship with each other to actually realize this shuttling action. Ordinarily, however, it is doubtful owing to the rapidity of the torque reliefs that the teeth 49 would have time to fully complete the shuttling action between the sides of teeth 50, 51 at least to the extent of imposing successive loads of any appreciable amount. Therefore, the teeth 49, if they move back and forth to any appreciable extent relative to sleeve F, have more in the nature of a practically continuous vibratory movement during and to accommodate the sleeve release. Still further, inasmuch as it is not actually necessary to fully unload the imposed torque at teeth 49 in order to allow the sleeve F to move, the effect of the cams 70, 71 may be to impart only torque relieving and restoring impulses at the teeth 49 as this will have the same effect to allow step-by-step release of sleeve F as in the case of actual multiple torque reversals.

In practice I find that the relationship of the cams 70, 71 to the other parts is not especially critical and can readily be arranged to accomplish the functions desired whereby under all desired conditions the sleeve F will fully release and not stick at some point along its path of releasing movement. Obviously there will be no exactly determinable stage positions in the releasing relationship between teeth 49 and sleeve F corresponding to the illustrated positions II, III and IV of Fig. 14 but the assumed positions will serve to illustrate the manner of releasing the sleeve by my invention. In Fig. 13 the distances 580, 680 and 780 for successive travel of rod 68 correspond generally to accompanying movements of sleeve F from I to II, II to III, and III to IV.

In the event that latch 73 is raised to start rod 68 rearwardly at a time when sleeve F is driving teeth 49, as in bringing the car to rest, then the cams 70, 71 function to provide a plurality of torque relief and restoring cycles just as set forth in connection with Fig. 14 except, of course, that unless these occur below or approximately at the idling speed of the engine there will not result any tendency to change the direction of imposed torque at teeth 49. Such arrangement may be provided although it is not altogether necessary as, in bringing the car to rest, the spring 67 is ordinarily of such strength as to cause release of the sleeve as the coast torque load becomes relatively small.

The vacuum supply to chamber 74 is under control of solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is deenergized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

The driver operated ignition switch is designated at L and comprises a conductor 96 which, in the Fig. 10 position showing the switch "on" or closed, electrically connects contacts 97 and 98. Contact 97 extends by conductor 99 to ammeter 100 and thence by conductor 101 to the usual storage battery 102 and thence to ground 103. Contact 98 has a conductor 104 extending therefrom to the engine ignition system herein shown in part as comprising coil 105 and distributor 106 having a primary terminal 107.

A second conductor 108 extends from contact 98 to the solenoid H and thence by conductor 109 to one terminal of ignition interrupter switch 78, the other terminal extending by a grounding conductor 110 to the primary terminal 107 of the distributor 106.

Branching from conductor 109 are two conductors 111 and 112, the former extending to governor switch 94 and thence to ground 113. Conductor 112 extends to kickdown switch 114 and thence to ground 115. The switch 114 is normally open and is closed preferably by a full depression of accelerator pedal 50' acting through link 116 and a bell-crank lever 116ᵃ pivotally mounted at 116ᵇ. Lever 116ᵃ actuates a link 116ᶜ which extends forwardly to adjust the engine throttle valve lever 117. When pedal 50' is thus depressed, the lever 117 is positioned to fully open the throttle valve 118 and as the throttle valve is adjusted in its wide-open range the lever 116ᵃ closes switch 114 to effect a step-down in the transmission from fourth to third or from second to first by energizing the solenoid H.

The governor solenoid circuit is as follows: ground 103 to battery 102 thence by conductor 101 to ammeter 100 and by conductor 99 to ignition switch L. From switch L this circuit extends through conductor 108 and solenoid H and thence by conductors 109 and 111 to switch 94 and ground 113.

The kickdown solenoid circuit is the same as the governor solenoid circuit to conductor 109 whence this circuit extends by conductor 112 to kickdown switch 114 and ground 115.

The engine ignition circuit is the same as the governor solenoid circuit up to the ignition switch L whence this circuit extends by conductor 104 to coil 105 and distributor 106.

The ignition grounding circuit under control of interrupter switch 78 extends from the distributor 106 through conductor 110 to interrupter switch 78. From switch 78 this grounding circuit extends through conductor 109 and thence to a suitable ground. In the illustrated arrangement this ground is provided either at 115 through conductor 112 and kickdown switch 114 or else at 113 through conductor 111 and governor switch 94.

In the operation of the mechanism, the car at standstill and with the ignition switch L closed and the engine idling will cause the solenoid H to be energized as in Fig. 10 because governor switch 94 is closed thereby establishing the governor solenoid circuit. Cylinder 74 is vented and sleeve F disengaged. The driver shifts sleeve 42 to either the high or low range and accelerates the car ordinarily above the critical speed of governor J thereby causing switch 94 to open to break the governor solenoid circuit. As vacuum builds up in the engine intake manifold K, plunger 80 now being lowered by spring 83 because switch 94 is open, piston 66 will be operated by vacuum thereby moving rod 68 to its Fig. 3 latched position. As soon as the driver allows the engine to coast, sleeve F will engage teeth 49 synchronously, to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 114 closes thereby energizing the kick-down solenoid circuit and causing solenoid H to raise plunger 80 and release latch 73 thereby venting chamber 74. At this time the sleeve F is under driving torque from the engine operating under wide open throttle. However, when latch 73 is released, spring 67 operates rod 68 rearwardly under accommodation of gap 76 to start the plurality of cycles of momentary ignition interruption by cams 70, 71 and switch 78 thus insuring release of sleeve F whereupon the ignition is finally restored at cam face 271 and the engine quickly speeds up to engage overrunning clutch E for establishing the third or first driving ratio depending on the setting of sleeve 42 prior to the kick-down operation.

On bringing the car to a stop when sleeve F is clutched as in fourth for example, the governor J opens governor switch 94 so as to de-energize solenoid H, vent chamber 74 and cause release of sleeve F so that the car will be started in third, assuming the manual sleeve 42 to be left in its forward high range shift position.

I claim:

1. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; drive control means operable to urge movement of said movable element from said engaging relationship into said disengaging relationship; and means operating as an incident to operation of said drive control means for momentarily interrupting said ignition system a plurality of times in sequence during said movement of said movable drive control element from said engaging relationship into said disengaging relationship.

2. In a drive for a motor vehicle according to claim 1; a single driver operable member; and means operating in response to driver operation of said single member for controlling operation of said drive control means and said ignition interrupting means as aforesaid.

3. In a drive for a motor vehicle according to claim 1; a speed responsive control device operable in response to predetermined speed of travel of the vehicle; and means operating in response to operation of said speed responsive control device for controlling operation of said drive control means and said ignition interrupting means as aforesaid.

4. In a drive for a motor vehicle according to claim 1; a single driver operable member; a speed responsive control device operable in response to predetermined speed of travel of the vehicle; and means selectively operating in response to driver operation of said single member and to operation of said speed responsive control device for controlling operation of said drive control means and said ignition interrupting means as aforesaid.

5. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a reciprocatory member for controlling movement of said movable drive-control element and adapted for movement from a first position accommodating said engaging relationship of said elements into a second position causing said disengaging relationship of said elements; and ignition controlling means adapted for actuation as an incident to movement of said reciprocatory member from its said first position into its said second position for effecting successive cycles of interruption and restoration of said ignition system.

6. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a reciprocatory member for controlling movement of said movable drive-control element and adapted for movement from a first position accommodating said engaging relationship of said elements into a second position causing said disengaging relationship of said elements; a switch operable to control said ignition system and adapted for operation from a first position accommodating operation of said ignition system to a second position for interrupting said ignition system; and means operating as an incident to movement of said reciprocatory member from its first said position into its second said position for causing said switch to operate sequentially a plurality of times from its said first position to its said second position.

7. In a drive for a motor vehicle having an engine; transmission mechanism operable to provide a drive from the engine to the vehicle, said mechanism including positively engageable drive-control elements one of which is movable into engaging relationship to the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a reciprocatory member for controlling movement of said movable drive-control element and adapted for movement from a first position accommodating said engaging relationship of said elements into a second position causing said disengaging relationship of said elements; a switch operable to control said ignition system and adapted for operation from a first position accommodating operation of said ignition system to a second position for interrupting said ignition system;

and switch-operating means carried by said reciprocatory member and adapted to operate said switch sequentially a plurality of times from its said first position to its said second position in response to movement of said reciprocatory member from its said first position to its said second position.

8. In a drive for a motor vehicle having an engine provided with a throttle; means operable by the vehicle driver for controlling opening and closing of said throttle; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; drive control means operable to urge movement of said movable element from said engaging relationship into said disengaging relationship; means operating as an incident to operation of said drive control means for momentarily interrupting said ignition system a plurality of times in sequence during said movement of said movable drive control element from said engaging relationship into said disengaging relationship; and means operating in response to driver operation of said throttle controlling means for throttle opening for causing operation of said drive control means and said ignition interrupting means as aforesaid.

9. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause momentary relief of said thrust-application; drive control means operable to urge movement of said movable element from said engaging relationship into said disengaging relationship; and means operating as an incident to operation of said drive control means for causing operation of said relief means a plurality of times in sequence during said movement of said movable drive control element from said engaging relationship into said disengaging relationship.

10. In a drive for a motor vehicle according to claim 9; a single driver operable member; and means operating in response to driver operation of said single member for controlling operation of said drive control means and said relief means.

11. In a drive for a motor vehicle according to claim 9; a speed responsive control device operable in response to predetermined speed of travel of the vehicle; and means operating in response to operation of said speed responsive control device for controlling operation of said drive control means and said relief means as aforesaid.

12. In a drive for a motor vehicle according to claim 9; a single driver operable member; a speed responsive control device operable in response to predetermined speed of travel of the vehicle; and means selectively operating in response to driver operation of said single member and to operation of said speed responsive control device for controlling operation of said drive control means and said relief means.

AUGUSTIN J. SYROVY.